(12) United States Patent
Sazzad

(10) Patent No.: US 6,397,237 B1
(45) Date of Patent: May 28, 2002

(54) METHODS AND APPARATUS FOR IMPLEMENTING AND USING PROCESSORS WITH SIGN FUNCTION CAPABILITY

(75) Inventor: Sharif Mohammad Sazzad, Monmouth Junction, NJ (US)

(73) Assignee: Hitachi America Ltd.

( * ) Notice: Subject to any disclaimer, the term of this patent is extended or adjusted under 35 U.S.C. 154(b) by 0 days.

(21) Appl. No.: 09/809,594

(22) Filed: Mar. 15, 2001

Related U.S. Application Data

(62) Division of application No. 09/105,225, filed on Jun. 26, 1998, now Pat. No. 6,292,814.

(51) Int. Cl.$^7$ ............................................. G06F 7/38
(52) U.S. Cl. ..................................................... 708/490
(58) Field of Search .............................. 708/490, 200, 708/270, 274

(56) References Cited

U.S. PATENT DOCUMENTS

| | | | | |
|---|---|---|---|---|
| 5,634,087 A | * | 5/1997 | Mammone et al. | 706/25 |
| 5,764,553 A | * | 6/1998 | Hong | 708/400 |
| 5,808,573 A | * | 9/1998 | Shih et al. | 341/110 |
| 6,148,101 A | * | 11/2000 | Tanaka et al. | 382/156 |
| 6,304,620 B1 | * | 10/2001 | Rouphael | 375/344 |

FOREIGN PATENT DOCUMENTS

| | | |
|---|---|---|
| EP | 0 328 871 A2 | 8/1989 |
| EP | 0 593 107 A1 | 4/1994 |
| EP | 0 664 492 A1 | 3/1995 |
| EP | 0 730 219 A2 | 9/1996 |
| EP | 0 755 015 A1 | 1/1997 |
| JP | 60167030 | 8/1985 |

\* cited by examiner

*Primary Examiner*—Tan V. Mai
(74) *Attorney, Agent, or Firm*—Straub & Pokotylo; Michael P. Straub

(57) ABSTRACT

Methods and apparatus for implementing and using a sign(x) function are described. In accordance with the present invention, the sign(x) function is implemented in hardware, e.g., by incorporating a simple circuit of the present invention into a central processing unit (CPU). By taking a hardware approach as opposed to the known software approach to implementing a sign(x) function, the present invention provides for an efficient sign(x) function implementation that is well suited for both SISD and SIMD systems. The hardware required to implement the sign(x) function in accordance with the present invention is relatively simple and allows for the sign(x) function to be determined in a single processor clock cycle. This is in sharp contrast to the plurality of processor clock cycles normally required to determine the sign(x) function in software embodiments. A processor sign(x) command is supported in embodiments where the hardware for performing the sign(x) function is incorporated into a processor. By incorporating a single sign(x) circuit into a processor a SISD sign(x) function can be supported. By duplicating the basic sign(x) hardware within a processor, in accordance with the present invention, a SIMD sign(x) function can be implemented. The sign(x) hardware and novel sign(x) processor command of the present invention, can be used to facilitate a variety of applications where the sign(x) function is encountered.

10 Claims, 6 Drawing Sheets

| Equation | operations per coefficient | | | | Total for 64 coefficients |
|---|---|---|---|---|---|
| | Add/Sub | Mult/Div | Compare | Total | |
| (1) | 1 | 4 | 0 | 5 | 320 |
| (2), (3) | 0 | 0 | 2 | 2 | 128 |
| (4) | 0 | 0 | 2 | 2 | 128 |
| (5) | 65* | 0 | 2* | - | 67 |
| | * for all 64 coefficients | | Total operations | | 643 |

There are $n/k$ sub-words ($W_0, \ldots, W_{n/k-1}$)

METHODS AND APPARATUS FOR IMPLEMENTING AND USING PROCESSORS WITH SIGN FUNCTION CAPABILITY

RELATED APPLICATION

This application is a divisional of U.S. patent application Ser. No. 09/105,225, filed Jun. 26, 1998 now U.S. Pat. No. 6,292,814.

FIELD OF THE INVENTION

The present invention relates to methods and apparatus for implementing and using a sign function suitable for use, e.g., in a single instruction multiple data (SIMD) system.

BACKGROUND OF THE INVENTION

The sign(x) function:

$$sign(x) = \begin{cases} +1 & x > 0 \\ 0 & x = 0 \\ -1 & x < 0 \end{cases} \quad (1)$$

is encountered in many common applications.

In applications involving the use of single instruction single data (SISD) processors, the sign(x) function is frequently implemented as a series of logical tests implemented as individual processor instructions, e.g., a greater than test followed by an equals test. If the output of any test in the series is true, the next test need not be performed since, in a SISD embodiment, the output of the sign(x) function can be generated from a true outcome of any one of the logical tests (>, =, <) used to implement the function.

Accordingly, using a common SISD processor, the sign(x) function can be determined with relative ease using software and hardware supported logic tests. For this reason, among others, application designers have felt little need to avoid the use of the sign(x) function when designing applications including, for example, video processing operations.

One standard for the coding of motion pictures, commonly referred to as the MPEG-2 standard, described in ISO/IEC 13818-2 (Nov. 9, 1994) Generic Coding of Moving Picture and Associated Audio Information: Video (hereinafter referred to as the "MPEG" reference), relies heavily on the use of discrete cosine transforms, data quantization and motion compensated prediction to code video data. In this patent application, references to MPEG-2 compliant data streams and MPEG-2 compliant inverse quantization operations are intended to refer to data streams and inverse quantization operations that are implemented in accordance with the requirements set forth in the MPEG reference.

The MPEG reference describes in detail the processes involved in decoding a video bitstream that is compliant with the MPEG-2 standard. Many processes are involved in the decoding of a video bitstream. Important to the development of low cost video decoders, are methods for efficient implementation of these processes. One of these process involved in decoding an MPEG-2 image is called inverse quantization.

Quantization is the process that is used in the digital processing of signals, e.g., video encoding, in which an element from a finite set of digital codewords is used to represent approximately, the value of a sampled signal. The digital codewords that are produced by the quantization process for an input sample represent an approximation of the original amplitudes of the signal being processed.

Inverse quantization is the opposite process of quantization. The inverse quantization process takes as its input a digital codeword from a finite set of codewords and produces a so called reconstruction level that is an approximation of the original amplitude of the sample.

The MPEG-2 standard defines methods for the inverse quantization of DCT coefficients. A significant problem encountered when trying to implement the MPEG-2 inverse quantization process is the computation of the sign(x) function required for inverse quantization.

The inverse quantization of one 8×8 block of coefficients, in accordance with the MPEG-2 standard, is described by equations (2)–(6) below.

$$F''[v][u] = \frac{(2 \times QF[v][u] + k) \times W[w][v][u] \times quantizer\_scale}{32} \quad (2)$$

where:

$$k = \begin{cases} 0 & \text{INTRA} \\ sign(QF[v][u]) & \text{NON INTRA} \end{cases} \quad (3)$$

and $$sign(x) = \begin{cases} +1 & x > 0 \\ 0 & x = 0 \\ -1 & x < 0 \end{cases} \quad (4)$$

QF[v][u] is a two dimensional array of digital codewords or quantized DCT coefficients, W[w][v][u] is a quantizer matrix, and quantizer_scale is a common scaling factor used for one or more macroblocks. The parameters v and u are used to index each DCT coefficient and the parameter w depends upon the coding type (INTRA or NON-INTRA) and the color component (luminance or chrominance). Following this step, the results undergo a saturation stage to ensure that the reconstructed values lie within the allowed range. This is shown in the equation 5 below.

$$F'[v][u] = \begin{cases} 2047 & F''[v][u] > 2047 \\ F''[v][u] & -2048 \leq F''[v][u] \leq 2047 \\ -2048 & F''[v][u] < -2048 \end{cases} \quad (5)$$

The final step in the inverse quantization process is to perform the mismatch control as shown below:

$$sum = \sum_{v=0}^{7} \sum_{u=0}^{7} F'[v][u] \quad (6)$$

$$F[v][u] = F'[v][u] \; \forall \, u, v \text{ except } u = v = 7$$

$$F[7][7] = \begin{cases} F'[7][7] & \text{if sum is odd} \\ \begin{cases} F'[7][7] - 1 & \text{if } F'[7][7] \text{ is odd} \\ F'[7][7] + 1 & \text{if } F'[7][7] \text{ is even} \end{cases} & \text{if sum is even} \end{cases}$$

The steps that are described by equations (2)–(6) are required for an inverse quantization process that is truly compliant with the MPEG-2 standard. Table I, illustrated in FIG. 1, shows the approximate number of discrete operations that are required to perform one particular known MPEG-2 inverse quantization operation on a block of 64 coefficients representing 64 values to be processed. Note that in Table 1, it is assumed that 2 compare operations are used to implement the sign(x) function for each processed coefficient.

Notably, while the mismatch control operation expressed as equation (6) appears to be the most complicated of all the steps in the MPEG-2 inverse quantization processes, it actually requires the least amount of computation, about 10% of the total. While the sign(x) function appears to be much less complicated than the mismatch control, the cost in terms of required computations for that function is about 20% of the total number of computations required.

Accordingly, when attempting to reduce the number of computations required to implement an inverse quantization operation, the sign(x) function presents an area where there is potential for improvement in terms of the number of computations which need to be performed.

To increase computational efficiency and through put, single instruction, multiple data, (SIMD) processor designs and systems are becoming more common. SIMD architectures allow the processing of multiple data elements simultaneously by treating a single n bit word as comprising, e.g., k, multiple distinct sub-words which are to be processed separately. A well-designed SIMD architecture system allows considerable performance advantages of more traditional Single-Instruction Single Data (SISD) architecture systems. An example over a SIMD architecture is the MMX technology that is currently in usage in the microprocessor area.

For purposes of explanation, suppose that there is a system based on a SIMD architecture that operates on four data samples at the same time. In such a system the data samples would have to be presented to the processing unit in the arrangement shown in the diagram of FIG. 2. Here, one word that is n-bits in length, contains four sub-words, each n/4-bits in length. Accordingly, even though one n-bit word is presented, e.g., to the processor, there are actually four pieces of data that are embedded in that word. When presented to the SIMD processing unit, each of these quarter-words is treated independently of the others. The independent processing of data elements included in a single word is one of primary features of SIMD processing.

As an example of SIMD processing, suppose that it is desired to multiply two sets of numbers, {a, b, C, d} and {e, f, g, h} to produce {a·e}, {b·f}, {c·g} and {d·h}. In the exemplary SIMD architecture, it is possible to set up two data elements similar to the ones shown in FIG. 4. One of these would contain the set {a, b, c, d} and the other would contain the set {e, f, g, h}. They may be presented to the SIMD processing unit for the desired multiplication. The processing unit will treat the four quarters of the input data words as independent quantities during the computation. An important consequence of this is that if the multiplication for any of the quarters overflows, the overflow will not affect the adjacent quarter. The four multiplications occur simultaneously which provides a tremendous increase in performance over a SISD processing unit operating at the same clock rate. It can be seen from this example that the SIMD architecture is extremely beneficial for processing multiple pieces of data in parallel.

Implementing the sign(x) function in a SISD processor embodiment as a series of processor instructions is relatively straight forward. However, it becomes comparatively complicated to implement the sign(x) function in a SIMD processor environment.

The complexity of implementing the sign(x) in a SIMD architecture results from the fact that a true result of a SIMD (<, =, or >) operation applied to the elements of an n-bit word may result in different outcomes for each of the n-bit subwords. Accordingly, when implementing a sign(x) function in a SIMD processor, usually at least two logic tests, each requiring one processor clock cycle, must be performed to determine the appropriate value for each of the sub-words in an n-bit word. Thus, when performing a sign(x) operation in a SIMD environment using software and conventional processor logic operations, it usually requires two or more processor clock cycles to generate the desired sign(x) output.

In the case of video decoding, and particularly real time video decoding, it is desirable to reduce the number of clock cycles required to decode a video signal thereby increasing throughput for a given processor speed. Accordingly, particularly in video decoder embodiments, it is desirable to implement the sign(x) function in a manner that requires the minimum possible number of clock cycles for the function to be performed.

In view of the above discussion, it becomes apparent that there is a need for new and improved methods of implementing the sign(x) function. It is desirable that any new methods be capable of performing the sign(x) function efficiently, in terms of the number of processor instructions which must be performed. It is also desirable that the sign(x) function be capable of being performed using relatively few processor clock cycles. In addition, it is desirable that any new methods and apparatus for implementing the sign(x) function be well suited for use in SIMD architectures and SIMD processors in particular.

New SIMD and SISD processor instructions capable of taking advantage of the processing capabilities of any new methods and apparatus are also desirable.

SUMMARY OF THE PRESENT INVENTION

The present invention is directed to methods and apparatus for implementing and using a sign(x) function. In accordance with the present invention, the sign(x) function is implemented in hardware.

By taking a hardware approach as opposed to the known software approach to implementing a sign(x) function, the present invention provides for an efficient sign(x) function implementation that is well suited for both SISD and SIMD systems.

The hardware required to implement the sign(x) function in accordance with the present invention is relatively simple and allows for the sign(x) function to be determined in a single processor clock cycle. This is in sharp contrast to the plurality of processor clock cycles normally required to determine the sign(x) function in software embodiments.

A processor sign(x) command is supported in embodiments where the hardware for performing the sign(x) function is incorporated into a processor. By incorporating a single sign(x) circuit into a processor a SISD sign(x) function can be supported. By duplicating the basic sign(x) hardware within a processor, in accordance with the present invention, a SIMD sign(x) function can be implemented.

The sign(x) hardware and novel sign(x) SISD and SIMD processor instructions of the present invention, can be used to facilitate a variety of applications where the sign(x) function is encountered, including video decoding applications involving MPEG-2 inverse quantization operations.

Numerous additional features and embodiments of the present invention are discussed below in the detailed description which follows.

DETAILED DESCRIPTION

As discussed above, the present invention is directed to methods and apparatus for implementing and using a sign function. In accordance with the present invention, the sign(x) function is implemented in hardware, e.g., by incorporating a simple circuit of the present invention into a central processing unit (CPU). The methods and apparatus of the present invention are well suited for implementing a sign(x) function in either SISD or SIMD systems.

The methods and apparatus of the present invention for efficiently implementing the sign(x) function will now described.

Figures 1, 2:
FIG. 1 illustrates a table showing the number of operations required using a known technique to perform an inverse quantization operation on a block of 64 DCT coefficients.
FIG. 2 illustrates a known arrangement for storing four sub-words in a word for use in a SIMD system.
Figure 3:
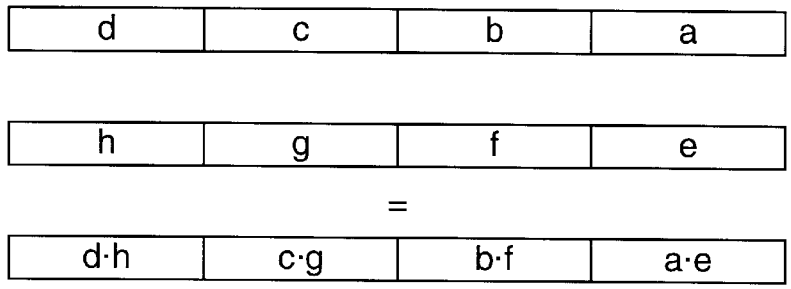
FIG. 3 illustrates a known SIMD multiplication operation.
Figure 4:
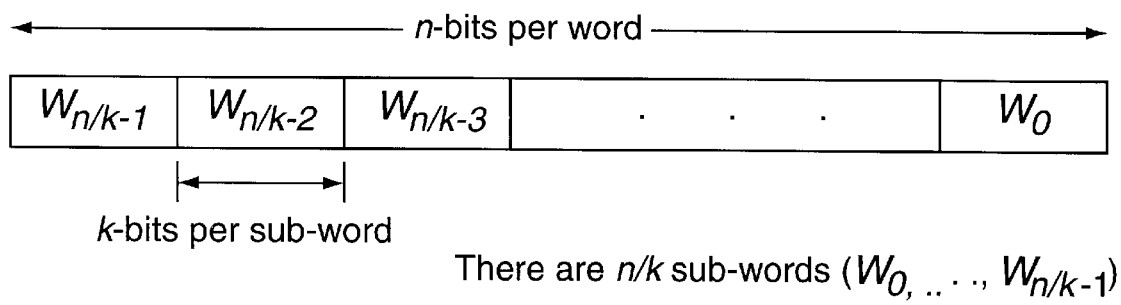
FIG. 4 illustrates an arrangement for storing k subwords in an n-bit word for use in a SIMD system.

For purposes of explanation, suppose that the basic data word in a SIMD system of the present invention has n bits and that these n bits are partitioned into k independent sub-words each of length n/k bits as illustrated in FIG. 4. In such a case, a set of n/k quantized coefficients, representing a portion of an image, may be stored in a single word assuming that each individual coefficient can be represented easily with fewer than k bits.

In the case of a video decoder embodiment, it is desirable that the sign(x) function for each of the n/k quantized coefficients be computed simultaneously in an efficient manner. This may be done by placing each of the coefficients in a single word and then processing the individual coefficients by performing a SIMD sign(x) operation in accordance with the present invention.

The present invention takes advantage of the fact that in a SIMD architecture, each of the sub-words of an n-bit word is treated independently. Accordingly, the circuit for computing the sign(x) function for the n/k quantized coefficients simultaneously may be viewed as multiple instances of one "atomic" circuit which operate in parallel.

Figure 5:
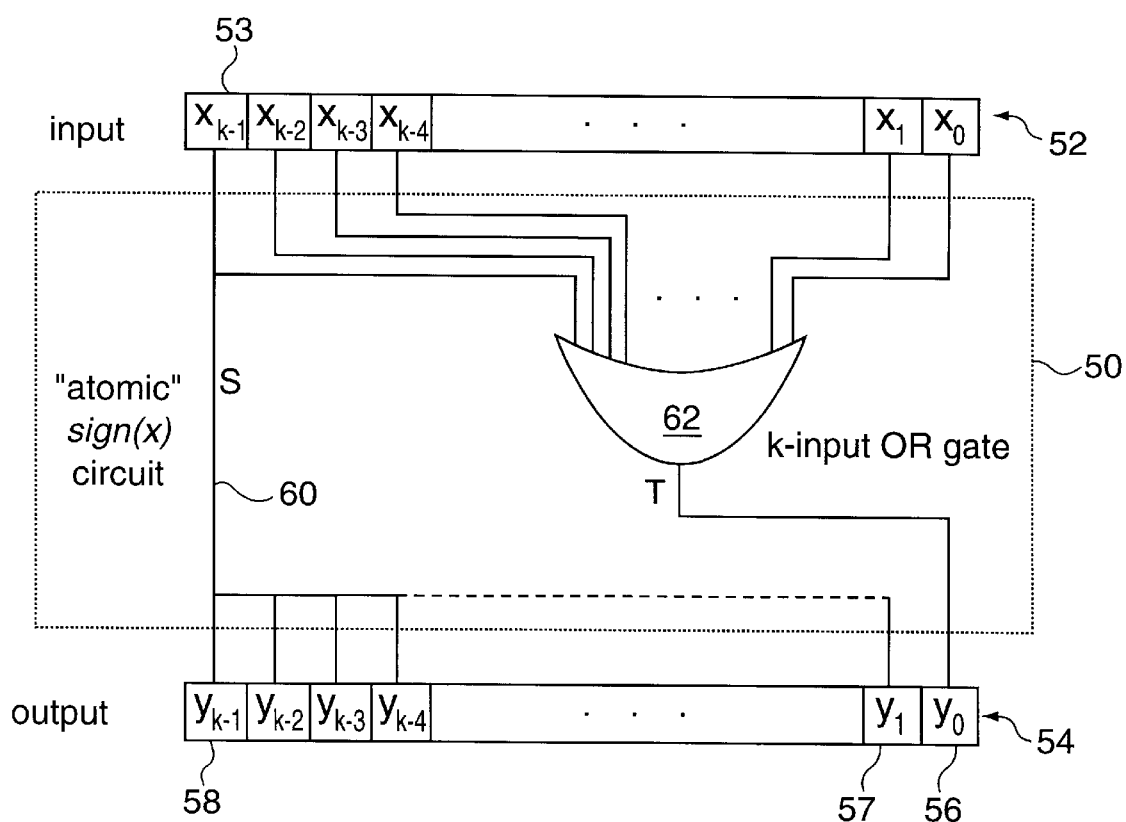
FIG. 5 illustrates a circuit for performing a sign(x) function in accordance with one embodiment of the present invention.

A hardware circuit, a sign(x) circuit 50 of the present invention for efficiently implementing the sign(x) function for a single k bit input value x is illustrated in FIG. 5. As illustrated, the sign(x) circuit 50 comprises a bus 60 and a k input OR gate 62. First and second k bit registers 52, 54 are used for store the input and output values of the sign(x) circuit 50, respectively. In embodiments where the output is to be stored in the same register as the input, a single register 52 may be used with the output over-writing the input.

In the exemplary embodiment of FIG. 5, 2's complement representation of numbers is used.

Accordingly, the highest order bit of the input value x, i.e., the k−1 bit stored in input register location 53, 25 indicates whether the input value x is positive or negative. When the k−1 bit has the value of 0 it indicates that value x is a positive value. When the k−1 bit has the value of 1 it indicates that value x is a negative value.

The sign(x) circuit 50, generates as its output a k bit value y which is stored in the second k bit register 54. The highest numbered bit of the value y, stored in register location 55, indicates whether the value y is positive or negative in the same manner that the bit stored in input register location 53 indicates whether the input value x is positive or negative.

The sign(x) function generates an output value of zero in response to an x input value of zero. Accordingly, all the bits of the output value y should be zero when all the bits of the input value x are zero.

The sign(x) function generates an output value y of positive one in response to an input value greater than zero. Accordingly, when the input value x is a positive value greater than zero the output value y should be set to positive one. Thus, when the input value x has its highest number bit set to zero and one or more of its remaining bits set to one, the highest number bit of the value y should be set to zero, the lowest number bit, e.g., the 0 bit, set to one and all the other bits of the output value y set to zero.

The sign(x) function generates an output value y of negative one in response to an input value greater than zero. In 2's compliment representation, negative one is expressed in binary form as a value having all bits set to one. Accordingly, when the input value x has its highest number bit, stored in register location 53, set to one and one or more of its remaining bits set to one, indicating a negative value less than 0, all the bits in the output value y should be set to one.

In the FIG. 5 embodiment, the sign(x) circuit 50 is implemented using the single logical operator, i.e., the OR gate 62 and a simple to implement bus 60. The OR gate 62 receives as its input each of the k bits of the input value x and generates therefrom a single bit value T which is used as the 0 place bit 56 of the output value y. The bus 60 couples the register location 53 in which the highest bit, i.e., the k−1 bit of the input value x is stored, to one of the inputs of the OR gate 62 and to the first 57 through k−1 locations of the register 54 used to store bits 1 through k−1 of the output value y. In this manner, bits $y_1$ through $Y_{k-1}$ of the output value y are populated with the value S of the sign bit $x_{k-1}$ of the input value x.

In the FIG. 5 embodiment, the input word x=[$x_{k-1}$, $x_{k-2}$, . . . , $x_0$]. In order to compute the value of sign(x) in accordance with the present invention, two single-bit quantities S and T are derived from x via parallel hardware operations. The bit-value S is set to equal the sign bit, $x_{k-1}$, and the bit-value T is derived by performing a logical OR of all k bits of x. The operation of the sign(x) circuit 50, and the generation of the bit values S and T from the input value x, can be expressed in terms of equation (7)

$$S = x_{k-1} \tag{7}$$

$$T = \sum_{i=0}^{k-1} x_i$$

Note that the summation symbol in equation (7) is used to denote the logical OR of all k bits of the input value x. The output value y=sign(x) is formed by circuit 50 using S and T in accordance with equation (8).

$$y=[S,S,S,S, \ldots ,S,S,T] \tag{8}$$

Consider the case when the input x is equal to zero, i.e., all bits in the input value x are zero. In such a case, it is clear from (7) that T=0 and S=0 and so from (8) the output will be y=[0 0 0 . . . 0 0] which is the desired output y of the sign(x) function given an input value x of zero.

When the input x is greater than zero, the sign bit will be zero and so from (7) we have S=0. In addition, at least one of the input bits $x_{k-2} \ldots x_0$ will be one. Now since not all of the $x_i$'s are zero, the OR 62 of all the input bits $x_{k-1} \ldots x_0$ will result in T=1. In such a case, the output y=[0 0 0 . . . 0 0 1]. This is the desired output value of +1 given an input greater than 0.

Finally, when the input x is less than zero, the sign bit, $x_{k-1}$, and thus the value S, will be one. Since the bit $x_{k-1}$ is used in the OR operation which generates the value T the value of T will be 1. In such a case, from (7) we will have S=1 and T=1 which makes the output y=[1 1 1 1 . . . 1 1]–which is −1 in the utilized two's complement number system.

The above examples show that the sign(x) circuit 50 properly performs the sign(x) function.

In the FIG. 5, embodiment, it is possible to perform the calculation of the sign(x) function as a single operation. Thus the computation will be 50% faster than the known software embodiments which normally require two logic operations.

The sign(x) circuit 50 performs the desired sign(x) operation on a single k bit input value. As discussed above, in a SIMD environment it is desirable that the sign(x) function be performed on n/k k-bit sub-word units in parallel. In order to achieve such parallel processing, in accordance with the embodiment of the present invention illustrated in FIG. 6, the sign(x) circuit 50 is duplicated n/k times.

Figure 6:
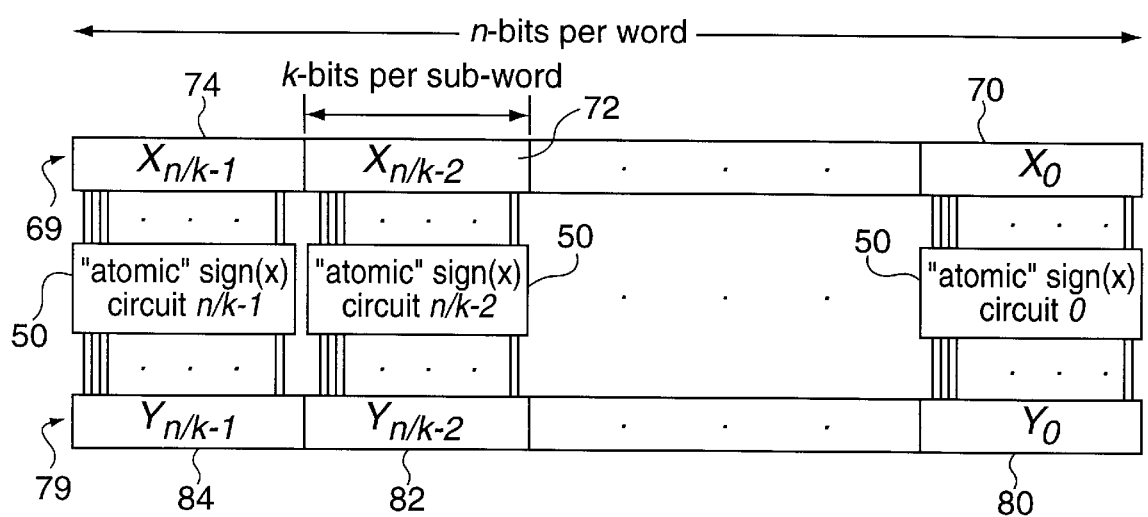
FIG. 6 illustrates an apparatus for implementing a sign(x) operation in a SIMD system in accordance with the present invention.

In the FIG. 6 embodiment, each k bit subword 70, 72, 74 of the n bit word 69 is processed separately, in the manner discussed above with regard to FIG. 5, by one of the sign(x) circuits 50 to generate a corresponding output 80, 82, 84 respectively. Thus, the circuit 600 illustrated in FIG. 6 will perform the sign(x) function on all n/k input sub-words simultaneously.

While there is an increase in hardware in the FIG. 6 embodiment, as compared to the FIG. 5 embodiment, because the k-input OR gate has to be replicated n/k times, the advantage is that n/k sign(x) operations are performed in parallel. Thus, a SIMD sign(x) operation can be performed in a single processor clock cycle. The basic sign(x) circuit 50 shown in FIG. 5 and the extended sign(x) circuit 600 shown in FIG. 6 are simple circuits that may be constructed easily using, e.g., Very Large Scale Integration (VLSI) technology, to produce extremely fast implementations. These sign(x) circuits 50, 600 may be incorporated into the cores of programmable, general purpose processors in order to support a processor instruction that causes the sign(x) function to be performed in a single processor clock cycle.

Figure 7:
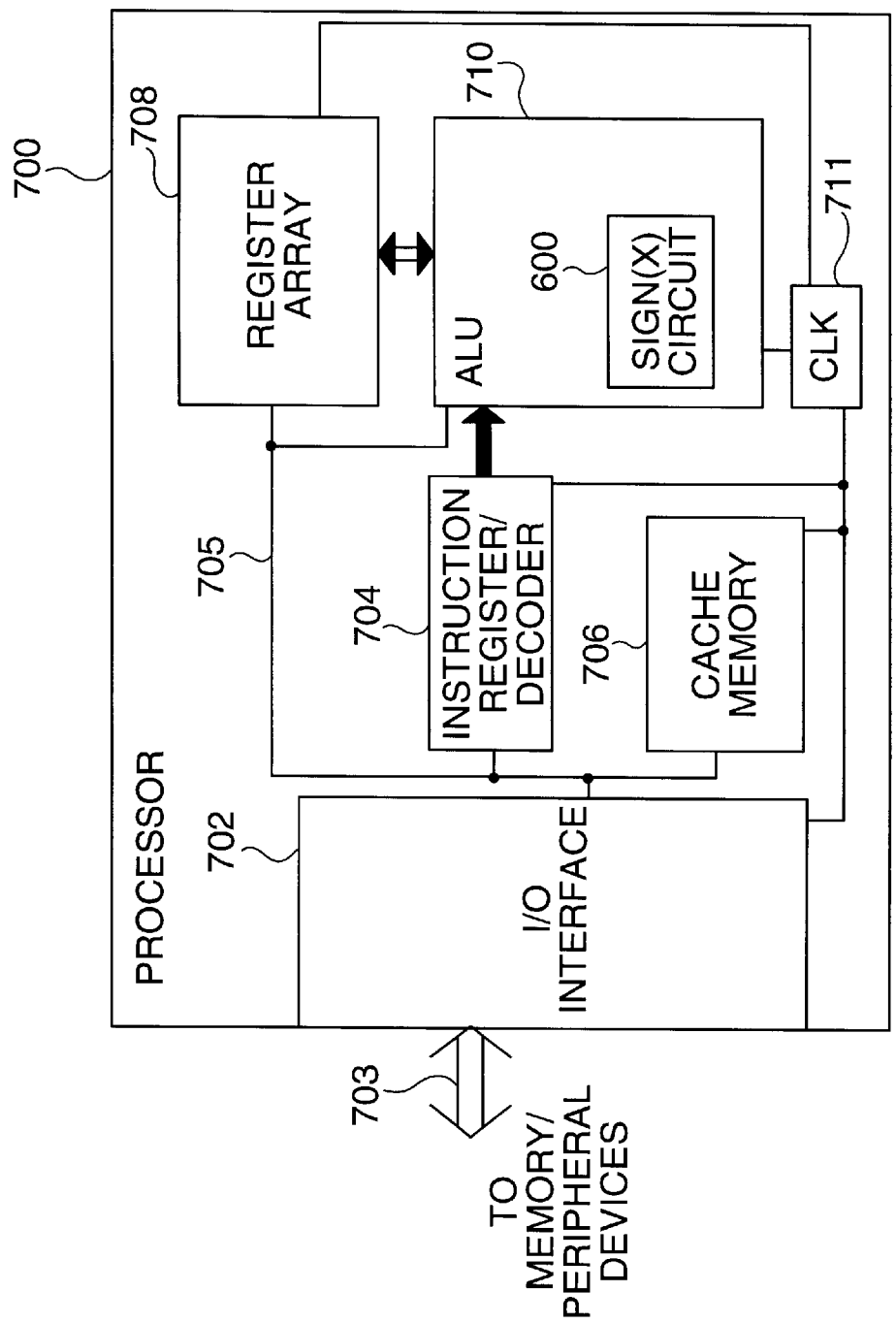
FIG. 7 illustrates a SIMD processor implemented in accordance with one embodiment of the present invention.

FIG. 7 illustrates a SIMD processor 700 implemented in accordance with one embodiment of the present invention. As illustrated the processor 700 includes an interface 702, a cache memory 706, instruction register/decoder circuit 704, register array 708 and arithmetic logic unit (ALU) 710 which are all coupled together via a bus 705. In addition, the processor includes a clock (CLK) 711 which is used to control the timing of operations performed by the various circuits included in the processor 700. The I/O interface 702 is used for coupling the processor 700 to a computer bus 703. The I/O interface 702 electrically interfaces between various circuits included in the processor 700 and circuits, e.g., memory and peripheral devices, coupled to the interface 702 via the bus 703.

Inside the processor, the cache memory 706 is used for storing instructions and data which may be needed by the other components of the processor 700. The instruction register/decoder is responsible for receiving instructions and for generating signals supplied to the ALU 710 which cause the instructions to be executed. In accordance with one embodiment of the present invention, the instructions which can be executed by the ALU 710 include a sign(x) function. In the SIMD processor embodiment illustrated in FIG. 7, the ALU 710 includes a sign(x) circuit 600 which is capable of performing a SIMD sign(x) operation in a single processor clock cycle. The register array 708 includes a plurality of register for storing data which is processed by the ALU 710 and generated as a result of ALU operations including sign(x) operations. Note that the register array is closely coupled to the ALU 710, as represented by the arrows there between so that the ALU 710 can quickly and efficiently access the contents of the register array 708.

A SISD processor embodiment is also contemplated. In such an embodiment, a sign(x) circuit 50 of the type illustrated in FIG. 5 is substituted for the sign(x) circuit 600 in the FIG. 7 embodiment.

The processor illustrated in FIG. 7 may be, e.g., part of a video decoder circuit or a general purpose computer used to perform MPEG-2 video decoding operations.

In addition to the sign(x) function circuits and processors incorporating such circuits discussed above, the present invention is directed to new and novel processor instructions which are capable of using the above described hardware of the present invention.

The instructions of the present invention include SISD and SIMD instructions, e.g., sign(x) instructions, which receive as their argument an n-bit value. In the case of a SISD instruction the value represents a single unit of data upon which the sign(x) function is to be performed. In the case of a SIMD embodiment, the n-bit unit of data represents n/k subwords upon which a sign(x) operation is to be independently performed. In response to receiving the sign (x) instruction of the present invention, a processor receiving the instruction uses a hardware circuit implementing the sign(x) function to generate an output corresponding to the sign(x) function in less than two processor clock cycles, e.g., in a single processor clock cycle.

Figure 8:
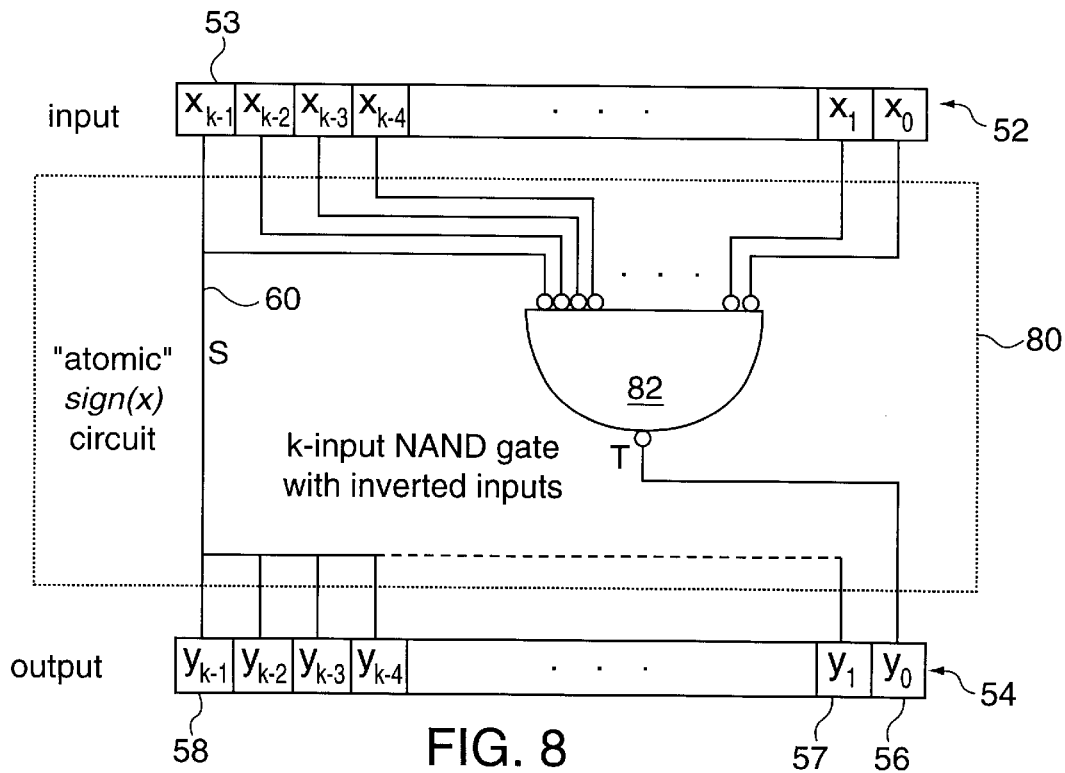
FIGS. 8 and 9 illustrate additional circuits, implemented in accordance with the present invention, for implementing a sign(x) function.
Figure 9:
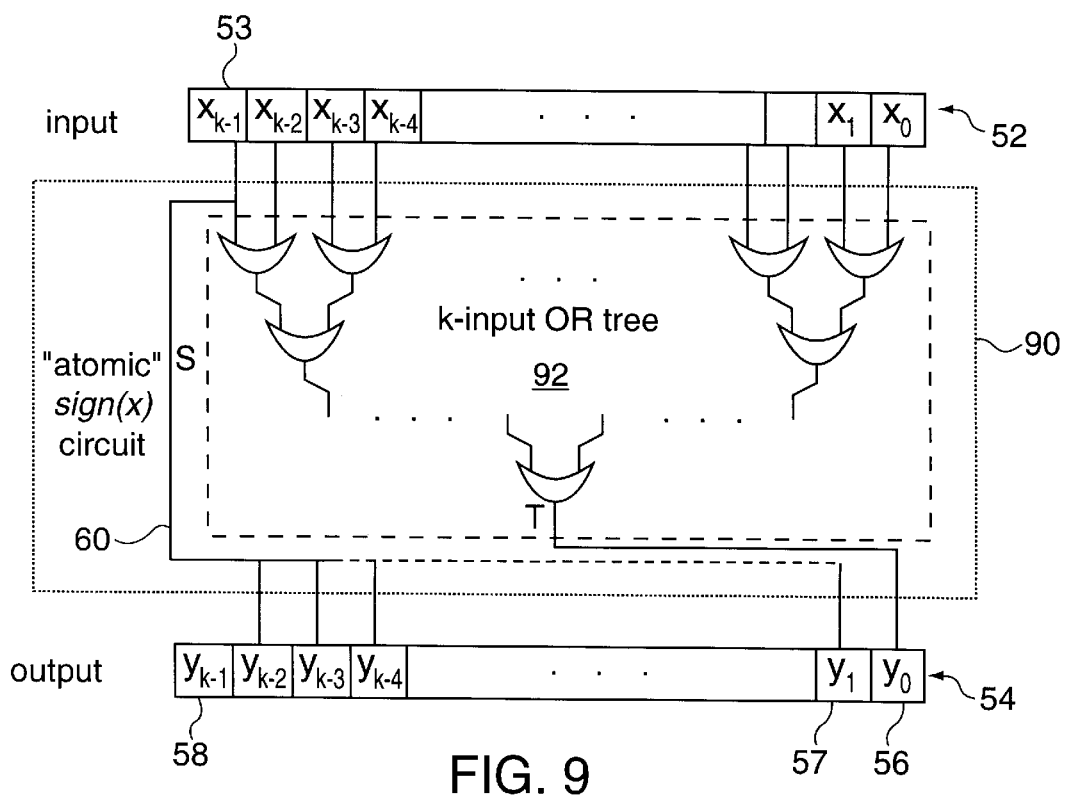

While the above discussion of the present invention has focused on a sign(x) circuit which uses an OR gate to implement the function, it is to be understood that the present invention contemplates various ways of implementing a hardware circuit that performs the sign(x) functionality in a single processor clock cycle. For example, it is possible to avoid the use of k-input OR gates by using a 'wired-OR.' Alternatively, it is possible to apply a logical transform and use an inverted input NAND gate to perform the OR function. FIG. 8 illustrates a sign(x) circuit 80 implemented using a k-input NAND gate 82 with inverted inputs in place of the OR gate 62. It is also possible to split up the logic, e.g., of the OR function, and compute the sign(x) function in logical stages. FIG. 9 illustrates an embodiment where the logical ORing operation is performed using a K input OR tree 90 which comprises a plurality of stages of OR circuits.

Regardless of the implementation, the use of a hardware circuit as the basis for supporting a sign(x) instruction in a programmable, general purpose processor remains a feature of the present invention.

What is claimed is:

1. A processor, comprising:
a processor clock; and
means for generating, in less than two processor clock cycles, an output value y, in response an input value x, the output value y assuming the value +1 in response to an input value x that is greater than zero, assuming a value of 0 in response to an input value x of zero, and assuming a value of −1 in response to an input value x that is less than one.

2. The processor of claim 1, further comprising:

a plurality of said means for generating, in less than two processor clock cycles, an output value of y, configured to operate in parallel.

3. The processor claim 2, wherein said processor clock and each of the plurality of said means for generating is implemented on a single semiconductor device; and said means for generating, generate an output in one processor clock cycle.

4. The processor of claim 2, further comprising:

means for utilizing each of the plurality of said means for generating in response to a processor instruction including as an argument a word including multiple input values x.

5. The processor claims 2, further comprising:

a data storage device for storing image data to be decoded.

6. A method of operating a processor which operates in response to a processor clock, comprising the steps of:

receiving an instruction to generate an output of +1 when provided with an input value greater than 0, to generate an output of 0 when provided with an input value of 0; and an output of −1 when provided with an input less than 0;

receiving an input value;

generating in less than two processor clock cycles, using a hardware circuit included in the processor, an output value in response to the received instruction and the received input value.

7. The method of claim 6, wherein the instruction is a single instruction multiple data instruction and wherein the input value is one of K subwords included in a received n bit word, the method further comprising the steps of:

generating in less than two processor clock cycles, using an additional k−1 hardware circuits included in the processor, an additional k−1 output values in response to the received instruction and the received n-bit word.

8. The method of claim 7, further comprising the step of:

arranging video data to be decoded to form the n-bit word.

9. The method of claim 8, further comprising the step of:

further comprising the step of performing an inverse quantization operation using said instruction and said n-bit word.

10. The method of claim 7, further comprising the step of operating said hardware circuit and the additional k−1 hardware circuits in parallel to generate said output value and said k−1 additional output values from the n-bit word in a single processor clock cycle.

* * * * *